United States Patent [19]

Avicola et al.

[11] 4,264,870

[45] Apr. 28, 1981

[54] AUTOMATIC LOCKING SYSTEM FOR AN INJECTION LOCKED LASER

[75] Inventors: Kenneth Avicola; Gilbert Baker, both of Richland, Wash.

[73] Assignee: Jersey Nuclear-Avco Isotopes, Inc., Bellevue, Wash.

[21] Appl. No.: 86,050

[22] Filed: Oct. 18, 1979

[51] Int. Cl.³ .......................... H01S 3/098; H01S 3/13
[52] U.S. Cl. .................................. 330/4.3; 331/94.5 S
[58] Field of Search ..................... 330/4.3; 331/94.5 S, 331/94.5 ML; 356/350

[56] References Cited

U.S. PATENT DOCUMENTS

| | | | |
|---|---|---|---|
| 3,395,367 | 7/1968 | Bell et al. | 331/94.5 S |
| 3,739,295 | 6/1973 | Shah | 331/94.5 C |
| 3,747,004 | 7/1973 | Sasnett | 331/94.5 S |
| 3,902,130 | 8/1975 | Pike | 330/4.3 |
| 3,914,709 | 10/1975 | Pike et al. | 330/4.3 |
| 3,944,947 | 3/1976 | Pike et al. | 330/4.3 |
| 3,967,211 | 6/1976 | Itzker et al. | 331/94.5 S |
| 4,181,898 | 1/1980 | McAllister | 331/94.5 S |

OTHER PUBLICATIONS

Urisu et al., "Single Pulse . . . Laser Amplifier", 1/77, pp. 34–35, Optics Communications, vol. 20, #1.
Alcoch et al., "Injectrat Mode Locking . . . ", 3/77, pp. 89–91, IEEE S. Quart. Electron, vol. QR–13, #3.

*Primary Examiner*—Nelson Moskowitz
*Attorney, Agent, or Firm*—Weingarten, Maxham & Schurgin

[57] ABSTRACT

In an injection-locked laser system, a timing system for assuring the locking of an injection-locked oscillator to the frequency of a master oscillator. The system automatically controls the firing of the injection-locked oscillator in accordance with the difference in time between the production of a master oscillator pulse and the time that a predetermined population inversion level has been reached in the injection-locked oscillator as measured by a predetermined level of fluorescence produced by the injection-locked oscillator.

21 Claims, 3 Drawing Figures

AUTOMATIC LOCKING SYSTEM FOR AN INJECTION LOCKED LASER

FIELD OF THE INVENTION

This invention relates to injection-locked lasers and more particularly to a system for automatically controlling the relative timing between pumping of the injection-locked oscillator used in the injection-locked laser and the production of a pulse generated by a master oscillator used to determine the output frequency of the injection-locked oscillator.

BACKGROUND OF THE INVENTION

As described in U.S. Pat. No. 3,902,130 entitled "Improved Apparatus for Lengthening Laser Output Pulse Duration," issued to Charles T. Pike, Aug. 26, 1975, assigned to the assignee hereof, and incorporated herein by reference, recently developed tunable dye lasers permit the generation of spectrally pure laser radiation at very nearly any selected frequency over a range of frequencies associated with the particular dye, rather than being limited to the frequency output of only a few widely separated discrete wavelengths. When this type of laser is used to produce atomic or molecular resonant light, a single frequency of a specific wavelength radiation is typically employed to produce appropriate resonant response.

Where a dye laser is employed for this purpose, it is advantageous to amplify the pulse and increase the pulse duration in order to make more energy available. The Pike patent addresses this problem and solves it as follows. A low-power, short duration and spectrally pure laser pulse is applied to a regenerative laser amplifier. The laser amplifier, when energized or pumped, radiates in a spectrally broad frequency pattern which may be 100 angstroms in width. The broadband radiation is a result of stimulated emission in the active medium of the laser amplifier. If at the start of the stimulated emission, light of a given frequency from a master oscillator is introduced, the stimulated emission will occur only at this frequency. When this occurs, the laser amplifier is said to be locked to the master oscillator. In order for this locking to occur, the master oscillator pulse must exist in the amplifier material at the right instant of time. If the pulse occus early, it will have no effect. If it occurs late, the stimulated emission will have started and the amplifier will have a broadband output when it lases.

Such a system is now known as an injection-locked laser. This type of laser in general involves a master oscillator which is of low power and an injection-locked oscillator (ILO) which acts as the regenerative laser amplifier and includes an active medium into which the signal from the master oscillator is injected.

In order to time the generation of the pulse from the master oscillator so it occurs at the moment when the laser amplifier has been excited to an amplifying condition, but before self-oscillation, a control circuit is provided to activate the master oscillator in timed relationship to the pumping of the laser amplifier. This commences the regenerative cycle that produces a sequence of output pulses.

While the system described in the Pike patent operates very well for allowing the production of the high-power pulses of appropriate spectral content, degradation over time of the laser components may cause the production of a pulse from the master oscillator at a time which is non-optimal with respect to the energization of the active medium and a broad spectral output results. When this system is utilized for isotope separation, this broad spectral output may destroy the isotope selecting mechanism.

With respect to laser isotope separation processes, the master oscillator beam carries the precise narrow bandwidth wavelength information necessary for proper operation of the laser isotope separation process, and the ILO increases the energy in each pulse to the level required by the process. If the ILO fails to lock to the master wavelength, the energy contained in the pulse will be spread over a band-width several orders of magnitude greater than that needed to match the absorption bandwidth of the isotope to be separated, drastically reducing process efficiency. In fact, if the bandwidth is too broad, ionization of both the desired and undesired isotopes may occur, which defeats the separation process.

In summary, whether the ILO locks to the master oscillator pulse depends on the time of arrival of the master oscillator pulse with respect to the triggering of an ILO flashlamp and also the peak power of the master oscillator pulse. Lock can be lost due to the aging of the triggering circuits, Thyratron switches normally utilized, or the flashlamp. This problem is especially severe if the master oscillator pulse power is just great enough to lock when timing is optimally set.

If the master oscillator pulse arrives too early, the population inversion in the ILO active medium is too low to initiate stimulated emission at the master oscillator wavelength and hence lock to it. If the pulse arrives after the ILO has begun laser action on its own, the output will again be the broadened characteristic of the ILO cavity and the output will not be locked.

BRIEF SUMMARY OF THE INVENTION

In accordance with the present invention, it is a finding of the subject invention that the relative timing between the production of a pulse from the master oscillator and the exciting of the laser amplifier active medium can be adjusted by sensing off-axis fluorescence from the output of the laser amplifier. When a high-power pulse is generated through the use of a laser amplifier active medium, fluourescence intensity can be used as a measure of the degree of population inversion in the laser amplifier's active medium. This gives an accurate measure of what is actually occurring in the active medium such that excitation for the active medium may be automatically and accurately timed for the next pulse from the master oscillator.

It should be noted that the master oscillator pulse must arrive at the injection-locked oscillator in a time window which is typically 100 nanoseconds in width. Due to heat and other operating conditions, even if the system is initialized at one time, turning the system on after cooling can result in the master oscillator pulse arriving outside of the critical window.

In summary, the state of excitation of the ILO active medium is gaged by sensing the fluorescence output of the ILO. The time of arrival of the master oscillator pulse with respect to the fluorescence level can be measured and actively maintained at the optimum position. In order to accomplish this, in one embodiment, a photodiode is placed in position to detect the time of arrival of the master oscillator pulse. A second photodiode is placed just off axis from the laser beam where it can intercept a portion of the fluorescence output of the ILO. This output is detectable over an angle very large compared with the laser beam divergence. The difference in time of arrival of the master oscillator pulse as compared to the time at which the fluorescence has reached a predetermined desired level can be measured. Having developed an error signal proportional to the difference in time of occurrence of the master oscillator pulse and the fluorescence level, adjustments can be made in the time of production of either the master oscillator pulse or the time of excitation of the ILO. This assures locking of the ILO to the master oscillator as the ILO, trigger, switch and flashlamp components age.

This automatic synchronization assures that the active medium has reached an amplifying condition at the time of generation of the pulse from a master oscillator, but is not in such a condition that it has achieved a self-oscillatory or lasing condition. Thus spectral broadening of the output beam from the ILO is limited.

BRIEF DESCRIPTION OF THE DRAWINGS

These and other features of the present invention will be more clearly understood by reference to the detailed description of the preferred embodiment presented below for purposes of illustration, and not by way of limitation, and to the accompanying drawings of which.

DETAILED DESCRIPTION OF THE INVENTION

Figure 1:
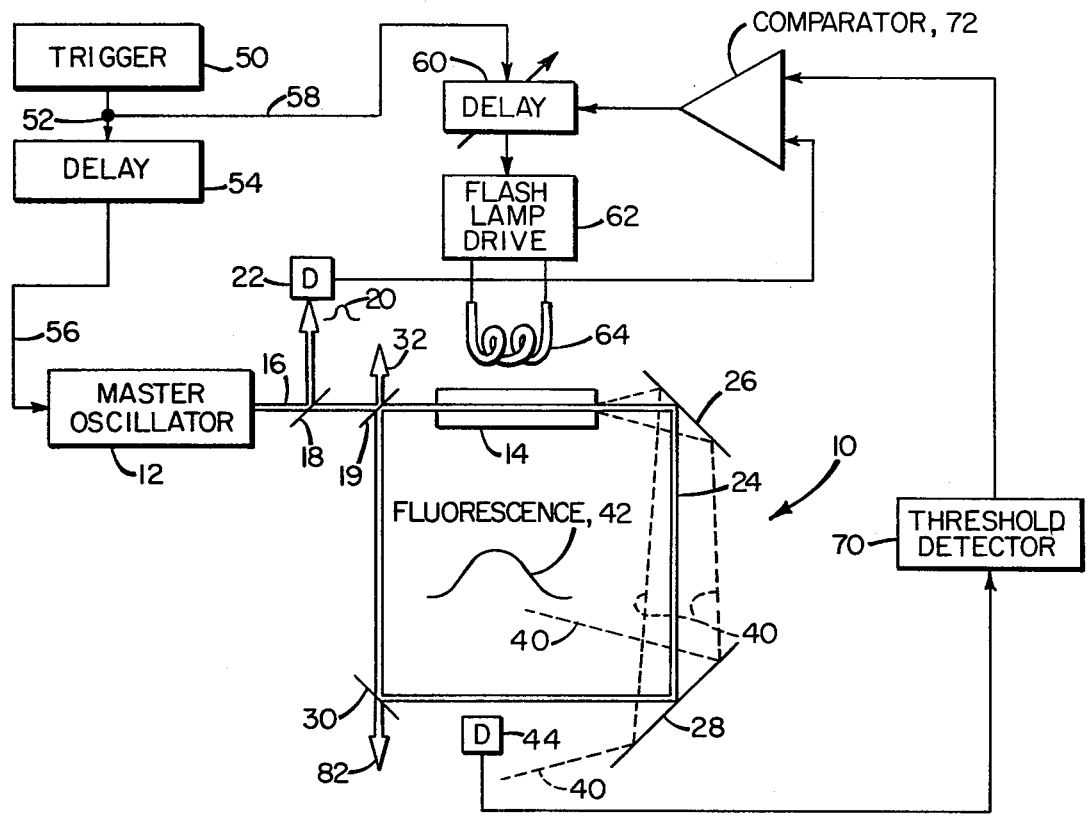
FIG. 1 is a system diagram illustrating the subject system, with flashlamp actuation being controlled by a variable delay circuit.

Referring now to FIG. 1, an injection-locked laser 10 includes a master oscillator 12 and a laser amplifier 14 in the form of an injection-locked oscillator (ILO). In a typical application, master oscillator 12 may be a dye laser, such as the Dial-A-Line laser of the Avco Everett Research Laboratory, Everett, Mass. In one embodiment, the laser is tuned to a predetermined spectral wavelength for absorption of a specific resonance point. The output of the master oscillator is a beam 16 which passes through a partially reflecting mirror 18 and a partially reflecting mirror 19 into the injection-locked oscillator. This oscillator typically utilizes a dye cell which contains an active medium. In one embodiment the cell may contain the commercially available dye Rhodamine 6 manufactured by Eastman Kodak.

The output of the master oscillator is a pulse such as that illustrated at 20, a portion of which is redirected by mirror 18 to a detector 22, which may be any of a wide variety of commercially available photodetectors or cells which respond to the desired wavelength of light.

A regenerative optical amplifier circuit is indicated by the closed path 24. ILO 14 is interposed in this path such that the output from ILO 14 is reflected in a ring by mirrors 26, 28 and 30. Mirror 30 redirects the beam to mirror 19 so as to complete a closed path. The output of laser 10 is illustrated by arrow 32. The output beam is relatively collimated and contains the result of the stimulated emission generated in ILO 14.

It is a finding of this invention that fluorescence occurs just prior to the production of stimulated emission in the active medium of ILO 14. This fluorescence is available off axis as illustrated by dotted lines 40, and is detectable without disturbing the main laser beam. In general, the fluorescence has a broad spectral content, usually as broad as the dye used in the laser amplifier. The spectral response thus includes the injection-locking spectral line. It is this fluorescence, generally indicated at reference character 42, which is detected by a detector 44 in an off-axis position as shown. Detector 44 may also be one of a variety of commercially available photodetectors or photocells.

In order to energize or pump the active medium of ILO 14, a trigger circuit 50 is employed to supply a trigger pulse over line 52 to a delay circuit 54, which may be a fixed delay circuit. The pulse from delay circuit 54 is delivered over line 56 to activate master oscillator 12 that either delay 60 or delay 54 may be varied so as to provide the appropriate relative timing between the pulse from the master oscillator and the flashlamp activation. How delay 60 is adjusted will be described for one embodiment in FIG. 3.

Figure 2:
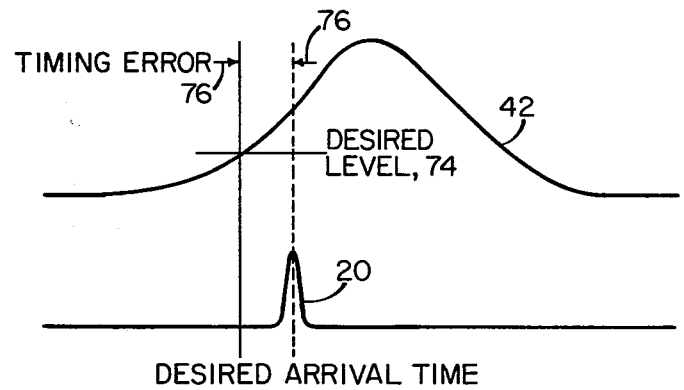
FIG. 2 is a waveform and timing diagram illustrating ILO fluorescence and master oscillator pulse production.

Referring now to FIG. 2, a situation is illustrated in which the pulse from the master oscillator 20 arrives late with respect to the time that a desired level 74 is reached in the growth of the ILO fluorescence curve 42. The timing error is as noted by arrows 76. In the illustrated case, the master oscillator pulse arrives too late and stimulated emission has already occurred in the active medium of the ILO. This produces a broad spectral response which, in general, is undesirable, especially when the subject system is utilized for isotope separation.

The desired level 74, as described hereinbefore, is an indication that the active medium contains sufficient energy for injection-locking, but self-oscillatory condition has not yet occurred. This means that the desired level indicates that the active medium is not lasing, but that an amplifying condition is imminent in the active medium.

While the desired level 74 can be calculated, it is more convenient to set the threshold detector level experimentally. As illustrated in FIG. 1, this is accomplished by measuring the amplitude of stimulated emission in the forward direction at, for instance, point 32 and in the backward or reverse direction, as indicated at point 82. The desired level or the appropriate threshold level is that level at which there is a maximum in forward radiation and a minimum in backward or reverse radiation.

Once threshold has been set, comparator 72 automatically adjusts delay 60 for any timing errors. These timing errors may accumulate because of deterioration of the trigger and/or flashlamp drive circuits or may simply be due to variations in the physical phenomena due to the heating up of the apparatus.

in a preferred embodiment, as mentioned before, there is a 100 nanosecond window in which the master pulse oscillator is to exist in order to obtain injection-locking. It has been calculated that with the control circuit to be described in connection with FIG. 3, an error of plus or minus no more than five nanoseconds can be maintained by the subject circuitry.

Figure 3:
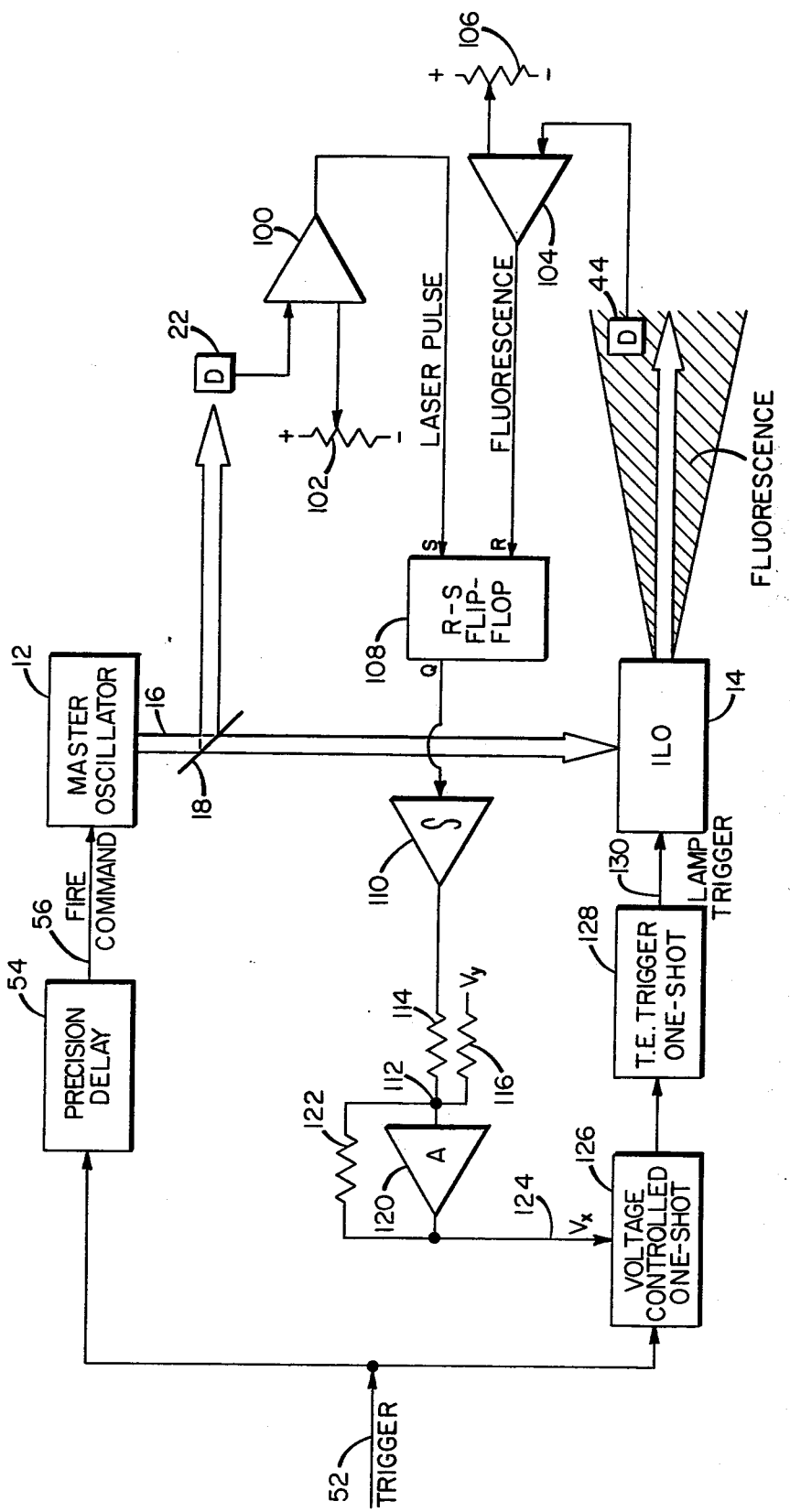
FIG. 3 is a block diagram of a timing control circuit utilizable in the subject invention.

Referring now to FIG. 3, the trigger signal on line 52 may be applied to a precision delay 54 which delays the pulse by approximately one microsecond. Thereafter, the fire command is delivered over line 56 to master oscillator 12. It will be appreciated that like components are given like reference characteristics vis-a-vis FIGS. 1 and 3. Mirror 18 redirects a portion of beam 16 towards detector 22 which is applied as one input to a comparator 100, such as National Semiconductor Model 319, to sense signals above a preset level set by potentiometer 102. Likewise, the output of detector 44 is applied to a like comparator 104 which functions as threshold detector 70 when set by potentiometer 106. Each of comparators 100 and 104 produce a logic level "1" pulse as soon as their respective thresholds are reached. The outputs from comparators 100 and 104 are applied respectively to the set and reset terminals of an R-S flip-flop 108 which is conventional in design. In general, the R-S flip-flop contains a pair of flip-flops which are used to detect and hold until the next pulse has arrived which pulse occurs first, either the laser pulse or the fluorescence pulse. The output of the R-S flip-flop is, in general, a digitized timing error signal which has three possible values: +1, 0 and −1. The logic states correspond to the following conditions: (a) +1 indicates that the master oscillator pulse has occurred before the time that the fluorescence has reached the predetermined level, (b) 0 indicates exact coincidence has been obtained between the occurrence of the master oscillator pulse and the time that the fluorescence has reached the predetermined level, and (c) −1 indicates that the time the fluorescence reached the predetermined level has occurred before the occurrence of the master oscillator pulse.

The output of flip-flop 108 is designated Q. This output is applied to a conventional integration circuit 110 which is provided with a time constant, T, which is 25 times that of the pulse repetition period, such that $T = 25/f$, where f is the pulse repetition frequency. This integration circuit in one embodiment employs an operational amplifier such as National Semiconductor Model LF356 with a capacitor in its feedback circuit. The output of integrator 110 is then scaled and summed at 112 with a bias voltage $V_y$, with the output of the integrator being supplied through a resistor 114 and the bias voltage being supplied through a resistor 116. Point 112 is connected to the input of an amplifier 120, such as National Semiconductor Model LF 356 used as a summing amplifier, which has a feedback circuit as indicated by resistor 122. The output of amplifier 120 is applied over a line 124 to a voltage-controlled one-shot multivibrator 126, such as Fairchild Model 96S02, and is designated as $V_x$. The Fairchild multivibrator is provided with an RC circuit to set the timing, with the resistor connected to a variable voltage source, in this case $V_x$. The output of the voltage controlled one-shot multivibrator 126 is a variable length pulse which is provided to a trailing edge trigger one-shot multivibrator 128, such as Fairchild Model 96S02, which produces a lamp trigger pulse over line 130 to trigger the flashlamp drive circuit 62, thereby to pump ILO 14.

In operation, a trigger pulse initiates the master oscillator via a precision delay. In addition, the trigger pulse also starts the voltage-controlled one-shot. The trailing edge of the voltage-controlled one-shot is then utilized via circuit 128 to pump the ILO. Since the control voltage, $V_x$ is an integral of the digitized timing error, the pulse width of the voltage-controlled one-shot, t, will change until the master oscillator and the ILO fluorescence are coincident. When the two pulses are synchronized, then the desired wavelength locking can be maintained. In essence, the length of the output pulse from multivibrator 126 is given by:

$$t = \tau \ln\left(\frac{2}{1 - V_x/V_{ss}}\right) \quad (1)$$

where $V_{ss}$ is the supply voltage for the one-shot.

It will be appreciated that this system provides discontinuous control insofar as there is some hunting associated with the output signals from flip-flop 108. In calculating the amount of hunting and therefore the amount of error which can be tolerated, the system described in FIG. 3 has a standard deviation which is given by the following formula:

$$\sigma = \tau \ln\left(1 - \frac{Ae^{t/\tau}}{2fT}\right) \quad (2)$$

where $\tau$ = the time constant of the voltge controlled one-shot 126; t = the pulse width of the voltage controlled one-shot 126; f = pulse repetition frequency of the master oscillator 12; T = integrator 16 time constant; and A = gain of summing amplifier 112. The standard deviation for the subject circuit has been found experimentally to be five nanoseconds which is an error clearly tolerable by the subject system in order to achieve injection-locking.

What has therefore been provided is a system which automatically adjusts the firing of a master oscillator and laser amplifier excitation means so as to achieve injection-locking of the laser amplifier to the frequency of the master oscillator, regardless of time-deteriorating conditions. The system is based on the utilization of fluorescence as the measuring parameter from which to ascertain the amplifying condition of the laser amplifier. This has proved to be an accurate measure of the amplifier's condition, and thus timing for the entire system is set in accordance with a predetermined fluorescence level. Moreover, fluorescence occurs off-axis so that it can be easily measured without disturbing the operation of the remainder of the system.

Having described above a preferred embodiment of the present invention, it will be clear to those skilled in the art that modifications and alternatives to the disclosed apparatus exist within the spirit and scope of the present invention. Accordingly, it is intended to limit the scope of the present invention only as indicated in the following claims.

What is claimed is:

1. In an injection-locked laser system of the type in which the frequency of the stimulated emission from a laser amplifier is locked to the frequency of light from a master oscillator, a method of synchronizing the production of a master oscillator pulse with the pumping of the laser amplifier, comprising the steps of:

sensing the time difference between the production of the master oscillator pulse and the time that fluorescence from the laser amplifier reaches a predetermined level; and adjusting the relative master pulse production and pumping times so as to minimize said sensed time difference.

2. The method of claim 1 wherein said level is that at which stimulated emission intensity in a forward direction is maximized.

3. The method of claim 1 wherein the fluorescence from the laser amplifier is sensed off-axis as compared with the axis of the stimulated emission from the laser amplifier.

4. The method of claim 1 wherein the adjusting step includes the steps of simultaneously generating two activation signals, one for initiating the production of a pulse from the master oscillator, and the other for initiating pumping, and delaying one of said activation signals in accordance with the sensed time difference so as to minimize said time difference.

5. The method of claim 4 wherein said sensing step includes the steps of comparing said production time and the time that the fluorescence reaches the predetermined level, producing a positive logic level signal for an occurrence of one time leading the other, a negative logic level signal for the reverse occurrence, and a logic level zero signal for time coincidence, and integrating the results of said comparing step to produce an error signal.

6. The method of claim 5 wherein said delaying step includes the step of altering said delay in accordance with the error signal.

7. In an injection-locked laser system of the type in which the frequency of the stimulated emission from a laser amplifier is locked to the frequency of light from a master oscillator, apparatus for synchronizing the production of a master oscillator pulse with the pumping of the laser amplifier, comprising:
  means for sensing the time difference between the production of the master oscillator pulse and the time that fluorescence from the laser amplifier reaches a predetermined level; and
  means for adjusting the relative master pulse production and pumping times so as to minimize said sensed time difference.

8. The apparatus of claim 7 wherein said level is that at which stimulated emission intensity in a forward direction is maximized.

9. The apparatus of claim 7 wherein said sensing means includes means for sensing in the fluorescence from the laser amplifier, said fluorescence sensing means being located off-axis as compared with the axis of the stimulated emission from the laser amplifier.

10. The apparatus of claim 7 wherein said adjusting means includes means for simultaneously generating two activation signals, one for initiating the production of a pulse from the master oscillator, and the other for initiating pumping, and means for delaying one of said activation signals in accordance with the sensed time difference so as to minimize said time difference.

11. The apparatus of claim 10 wherein said sensing means includes means for ascertaining said production time and the time that the fluorescence reaches the predetermined level, means for producing a positive logic level signal for an occurrence of one time leading the other, a negative logic level signal for the reverse occurrence, and a logic level zero signal for time coincidence, and means for integrating said logic level signals to produce an error signal.

12. The apparatus of claim 11 wherein said delaying means includes means for altering said delay in accordance with the amplitude of said error signal.

13. An injection-locked laser system comprising:
  a master oscillator;
  an injection-locked oscillator having an active medium;
  means for actuating said master oscillator to produce a pulse of radiation;
  means for directing said pulse of radiation into the active medium utilized by said injection-locked oscillator;
  means for pumping the active medium of said injection-locked oscillator;
  means for actuating said pumping means;
  means for sensing the time difference between the production of the master oscillator pulse and the time that fluorescence from said injection-locked oscillator reaches a predetermined level; and
  means coupled to both actuating means for adjusting the relative master pulse production and pumping times so as to minimize said sensed time difference.

14. The system of claim 13 wherein said level is that at which stimulated emission intensity in a forward direction is maximized.

15. The system of claim 13 wherein said sensing means includes means for sensing the fluorescence from said active medium, said fluorescence sensing means being located off-axis as compared with the axis of the stimulated emission from said injection-locked oscillator.

16. The system of claim 13 wherein said adjusting means includes means for generating two activation signals, means for coupling one of said activation signals to the actuation means of the master oscillator for initiating the production of a pulse from the master oscillator, means for coupling the other of said activation signals to the actuating means for said pumping means for initiating pumping, and means for delaying one of said activation signals in accordance with said sensed time difference so as to minimize the time difference.

17. The system of claim 13 wherein said sensing means includes means for ascertaining said production time and the time that the fluorescence reaches the predetermined level, means for producing a positive logic level signal for an occurrence of one time leading the other, negative logic level signals for the reverse occurrence, a logic level zero signal for time coincidence, and means for integrating said logic level signals to produce an error signal.

18. The apparatus of claim 17 wherein said sensing means includes a fluorescence threshold detector having a threshold set to said predetermined level.

19. The system of claim 17 wherein said logic level signal producing means includes an R-S flip-flop.

20. The system of claim 17 wherein delay means includes means for altering said delay in accordance with the amplitude of said error signal.

21. The system of claim 20 wherein said means for altering said delay includes means for producing a pulse having a length proportional to a control voltage, means for coupling said error signal to said proportional pulse length producing means for controlling pulse length, means coupled to said proportional pulse length producing means for sensing the trailing edge of the pulse therefrom and for producing a trigger pulse upon the occurrence of said trailing edge, and means for applying said trigger pulse to the actuation means for said pumping means.

* * * * *